United States Patent [19]
Anderson

[11] Patent Number: 4,552,465
[45] Date of Patent: Nov. 12, 1985

[54] TWO-POINT SPRING LOADED THERMOCOUPLE PROBE WITH REPLACEABLE TIPS

[75] Inventor: Albert R. Anderson, Export, Pa.

[73] Assignee: Aluminum Company of America, Pittsburgh, Pa.

[21] Appl. No.: 569,720

[22] Filed: Jan. 10, 1984

[51] Int. Cl.⁴ .......................... G01K 1/14; G01K 7/00
[52] U.S. Cl. .................................. 374/179; 136/230; 374/208
[58] Field of Search ................ 374/179, 180; 136/230, 136/235

[56] References Cited

U.S. PATENT DOCUMENTS 3,407,097  10/1968  Engelhard ...................... 374/180 X
3,812,716   5/1974  McIntyre ........................ 136/235 X Primary Examiner—Daniel M. Yasich
Attorney, Agent, or Firm—Elroy Strickland; John P. Taylor

[57] ABSTRACT

An improved two-point temperature probe is provided comprising a housing, a pair of bores within the housing to each respectively receive a thermocouple element, an end cap on the device covering the bores and having openings therein whereby a portion of the thermocouple elements may pass therethrough, collar means on the thermocouple elements cooperating with the end cap to retain the elements within the device, and bias means within the bores to yieldably bias the collars on the thermocouple elements against the end cap on the device, the device being further provided with means to prevent rotation of the thermocouple elements within the bores, and detachable tips on the thermocouple elements whereby the tip may be removed from the remainder of the thermocouple element and replaced when necessary due to wear or other type of damage without the necessity of replacing the entire thermocouple element.

19 Claims, 2 Drawing Figures

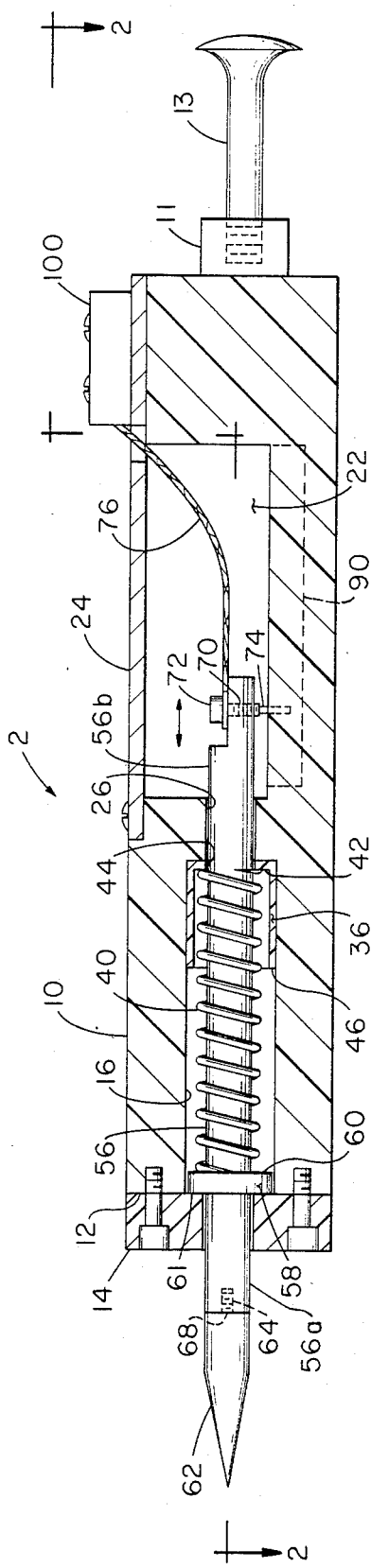
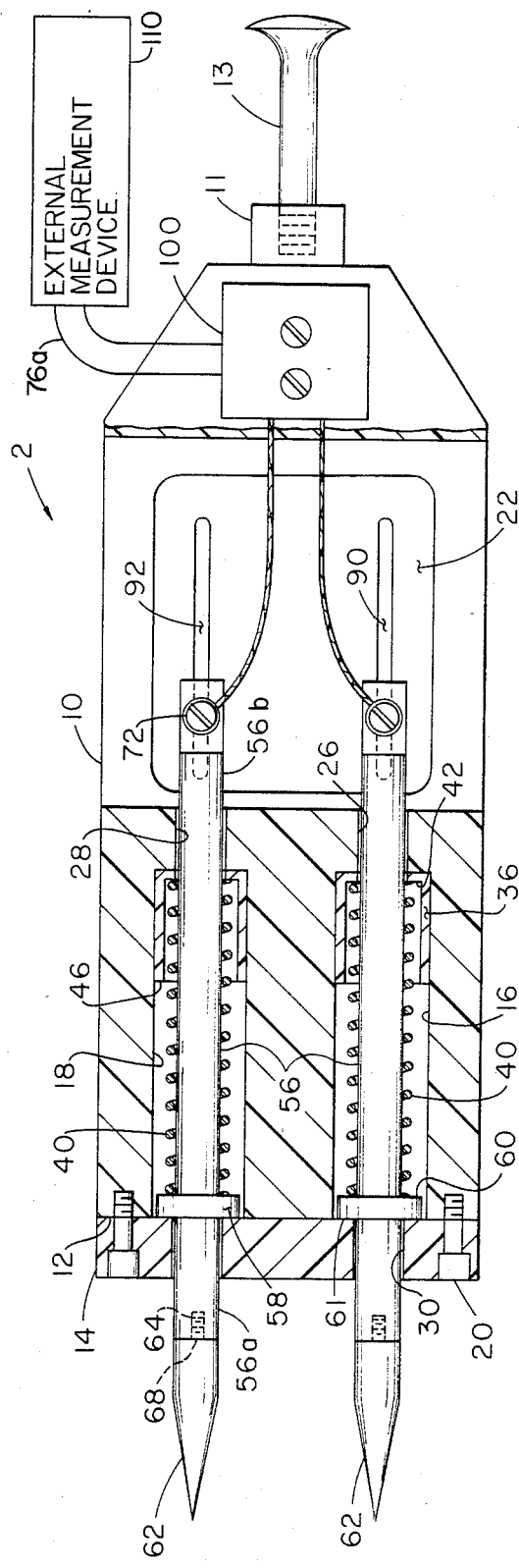

TWO-POINT SPRING LOADED THERMOCOUPLE PROBE WITH REPLACEABLE TIPS

BACKGROUND OF THE INVENTION

This invention relates to thermocouple devices. More particularly, the invention relates to a thermocouple device comprising a two-point, spring-loaded probe with replaceable tips.

Measurement of high temperature solid materials, such as, for example, the measurement of the temperature of hot metal ingots, is conventionally carried out using pointed thermocouple elements. These elements are, preferably, spring loaded to permit the user to engage the metal ingot with the measurement device using sufficient force to penetrate any oxide layer on the ingot. Typical of such a two-point spring-loaded probe is the device shown in Halstead U.S. Pat. No. 2,973,397. The probe is usually provided with pointed ends to facilitate pushing or driving the probe into the hot ingot to be measured. It is not uncommon to construct a probe in such a manner as to permit its being driven into the ingot by an external force. Alternatively, such a force could take the form of a spring-loaded impact device such as shown in Vollrath U.S. Pat. No. 2,405,076.

In any event, it will be appreciated that repeated engagements of such ingots or other metal objects will tend to blunt or bend the pointed elements, with the result of unreliable, inaccurate readings and/or frequent replacement of the elements, unless such elements are sufficiently durable or protected by rugged heat resistant structures. However, attempts to ruggedize and to increase the useful life of thermocouple elements have heretofore resulted in structures that tend to reduce the response time and accuracy of the thermocouples because of the increase in the mass and heat sinking effect of such structures.

For example, encasing the thermocouple junction within the pointed end of a steel probe results in a reduction in the response and accuracy of the device with the increase in the temperature of the junction being slow and gradual after the steel probe is placed in contact with the object under test. For example, a junction encased in such a steel probe might require as much as two and one-half minutes to reach its final temperature reading when measuring a 600° F. temperature in a 3/16 inch thick aluminum plate.

One attempt to increase the response time of the thermocouple while ruggedizing the device sufficiently to provide consistent temperature readings over extended periods of repeated use involves the use of two closely spaced relatively short thermocouple elements separated by a heat resistant insulating material. Such a device is described and claimed in Feichter et al U.S. Pat. No. 4,101,343.

However, in every instance, repeated use of the various devices tends to result in sufficient wear on the end or tip in contact with the hot metal so as to require replacement of the thermocouple element.

SUMMARY OF THE INVENTION

It is, therefore, an object of the invention to provide an improved two-point thermocouple probe having improved means for overcoming the problem of wear on the end portion thereof.

It is yet another object of this invention to provide an improved two-point thermocouple probe wherein each of the two thermocouple elements of the probe are independently spring-loaded and the end portion or tip of each of the thermocouple elements may be replaced individually.

It is yet a further object of the invention to provide a two-point thermocouple probe having independent spring-loaded thermocouple elements wherein means are provided to inhibit rotation of the main portion of each of the thermocouple elements of the probe while the end portion or tip is removed.

These and other obJects of the invention will become apparent from the following description and drawings.

In accordance with the invention, an improved two-point temperature probe is provided comprising a housing, a pair of bores within the housing to each respectively receive a thermocouple element, an end cap on the device covering the bores and having openings therein whereby a portion of the thermocouple elements may pass therethrough, collar means on the thermocouple elements cooperating with the end cap to retain the elements within the device, and bias means within the bores to yieldably bias the collars on the thermocouple elements against the end cap on the device, the device being further provided with means to prevent rotation of the thermocouple elements within the bores and detachable tips on the thermocouple elements whereby the tip may be removed from the remainder of the thermocouple element and replaced when necessary due to wear or other type of damage without the necessity of replacing the entire thermocouple element.

BRIEF DESCRIPTION OF THE DRAWINGS

FIG. 1 is a cross-sectional side view of the probe of the invention.

FIG. 2 is a cross-sectional top view of the probe of the invention.

DESCRIPTION OF THE PREFERRED EMBODIMENT

Referring now to FIGS. 1 and 2, the probe of the invention which is generally indicated at 2, comprises a body 10 which may be made of Micarta or other insulating material. A pair of bores 16 and 18 extend in parallel into body 10 form one end 12. The bores may be spaced apart at a distance of about ¾ inch from center to center. Body 10 is further provided with a hollowed out section 22 which may be covered over with a cover plate 24. A pair of smaller counterbores 26 and 28, respectively coaxial with bores 16 and 18, respectively interconnect bores 16 and 18 with recessed area 22. The diameter of counterbores 26 and 28 are sized to be slightly larger than the diameter of the thermocouple elements which will be mounted in the device.

Body 10 may be further proved with a threaded collar 11 to which may be mounted a handle 13 to assist in inserting the probe into or against the hot material whose temperature is to be measured.

Bores 16 and 18 are each fitted, respectively, with a thermocouple element and associated hardware which may be identical in physical shape. It will, therefore, be understood that the following description with regard to one of the thermocouple elements and associated components will be the same for the other. As shown in both FIGS. 1 and 2, sleeve member 36 is fitted into bore 16. Sleeve member 36 has a first open end 46 to receive a spring bias means 40. One end of spring 40 rests against a shoulder 42 on the opposite end of sleeve 36. Sleeve 36 is further provided at its opposite end, with an opening 44 of approximately the same diameter as bore 26.

A generally cylindrical thermocouple element 56 is received within spring 48 and has a first end which passes through opening 44 of sleeve 36 and bore 26 into hollowed out portion 22 of body 10. Thermocouple element 56 is further provided with a collar member 58 spaced from the first end and having a diameter approximating the diameter of bore 16. The opposite end of spring 40 abuts a shoulder 60 on collar member 58 urging an opposite shoulder 61 of collar 58 against an end cap 14 which is secured to body 10 by screws 20. A portion 56a of thermocouple element 56 extending beyond collar member 58 passes through a bore 30 in end cap 14.

End cap 14 may also be constructed of an insulating material such as Micarta or other insulating material capable of withstanding elevated temperatures. Alternatively, body 10 and end cap 14 could be constructed of metal if adequate measures were used to electrically insulate the thermocouple elements from body 10 and end cap 14.

In accordance with one aspect of the invention, electrode probe element 56 is provided with a detachable end point 62. As shown in FIGS. 1 and 2, end point or tip 62 may be provided with a threaded portion 64 which is received in a threaded bore 68 in probe 56. Alternatively, if desired, a bayonet-type or other quick disconnect type mounting may be provided. In either instance, the tip 62 may be easily detached from thermocouple element 56 and either replaced or sharpened and then reassembled to element 56, depending upon the type of maintenance needed.

In accordance with another aspect of the invention, hollowed out portion 22 of body 10 is provided with a pair of parallel slots 90 and 92 in registry with the spacing of bores 16 and 18 and counterbores 26 and 28. Element 56 is provided, adjacent end 56b, with a threaded bore 70 which receives a long screw 72 to provide a connection for a lead 76. Screw 72 is provided with a sufficiently long shank end 74 to comprise pin means which protrude beyond threaded bore 70 in element 56 to enter into (and thereby engage) either slot 90 or slot 92. As element 56 is depressed, thereby compressing spring bias means 48, the shank end 74 of screw 72 rides along the slot 90 or 92. However, when the end point or tip 62 is disassembled from element 56, as by unscrewing, the engagement of the shank end 74 of screw 72 in slot 90 or 92 prevents or inhibits rotation of element 56, thus facilitating the easy removal of tip 62.

As is well known to those skilled in the art, the two thermocouple elements 56, while being identical in physical shape, must be made or constructed of dissimilar thermocouple material. For example, one of the thermocouple elements 56 and its corresponding end point 62 may be made of alumel stock while the other thermocouple element 56 and its corresponding end point 62 may be made of chromel stock. The leads 76 may then be connected to a junction box 100. Leads 76a may then be connected, as is well known to those skilled in the art, to any conventional voltmeter or bridge or to a digital-type readout device generally designated as external measurement device 110 in FIG. 2 which may be calibrated to directly readout the temperature using the measured voltage differential generated by the thermocouple device.

Thus, the invention provides a simplified two-point thermocouple probe which may be used to provide accurate readings of hot materials such as, for example, a hot aluminum ingot, wherein the probe members may be forced into the ingot beyond the outside protective oxide layer without the usual attendant problems of the dulling of the tips of the thermocouple elements since the tip, if it becomes dull, may be easily dissembled from the remainder of the element and replaced without the need for complete replacement of the entire thermocouple element. This, in turn, permits the end point or tip to be made directly from the thermocouple metal without the further need for encasing the end tip in a more ruggedized construction, such as a steel casing, which would provide an undesirable thermal lag to the measurement. Furthermore, the novel construction provides a means for inhibiting rotation of the thermocouple element while still permitting a desired spring loading of each element whereby the tips of the two elements may be inserted variable distances into the ingot, depending upon the resistance encountered as the probe is forced or driven through the outer oxide layer.

Having thus described the invention, what is claimed is:

1. A thermocouple probe device for use in measuring the temperature of a metal comprising:
   (a) a housing;
   (b) two parallelly spaced apart elongated thermocouple elements respectively slidably received in said bores in said housing;
   (c) a first end portion detachably secured respectively to a first end of each of said thermocouple elements extending from said housing;
   (d) bias means engaging said thermocouple elements and said housing to resiliently mount each of said thermocouple elements in said housing; and
   (e) detachable means to secure leads to a second portion of each of said thermocouple elements, said detachable means further comprising means to inhibit rotation of said thermocouple elements in said housing to thereby facilitate removal of one of said first end portions from the remainder of said thermocouple element.

2. The device of claim 1 wherein said end portion of each of said thermocouple elements is threadably attached to said thermocouple elements.

3. The device of claim 1 wherein said means for inhibiting rotation of said thermocouple element comprises a slot in said body and engaging means carried by said thermocouple element which engage said slot to inhibit rotational movement of said thermocouple element.

4. The device of claim 3 wherein said engaging means carried by said thermocouple element comprises pin means extending from said thermocouple element into said slot.

5. The device of claim 4 wherein said pin means comprise a threaded member received in a threaded bore in said thermocouple element.

6. The device of claim 5 wherein said threaded member further comprises a connecting means for a lead to electrically connect said thermocouple element to an external measurement device.

7. The device of claim 1 wherein said thermocouple elements are made from dissimilar materials and said detachable end portion on each of said thermocouple elements is constructed of the same material as the thermocouple element to which it is detachably secured.

8. A thermocouple probe device comprising:
(a) a housing;
(b) two, spaced apart, detachably secured pointed members made of dissimilar materials are rotatably secured respectively to two thermocouple elements slidably extending from respective bores in one end of said housing;
(c) spring means engaging said elements and housing such that the members and elements are individually and resiliently mounted in said bores in said housing;
(d) elongated slots provided in said housing; and
(e) screw means extending through said elements and into said slots to prevent said elements from rotating whereby each of said pointed members can be selectively removed from said thermocouple elements by rotation of one of said respective pointed members while said screw means in said slot prevents said element from rotating.

9. The device of claim 8 in which said elements have ends located outside of said housing and said pointed members are threaded into said ends.

10. The device of claim 8 in which a handle is provided at the end of the housing opposite to the dissimilar elements for holding the device by hand.

11. A probe member for use in temperature measurement comprising:
(a) a housing body having a pair of parallel spaced apart bores;
(b) a sleeve member mounted in a first end in each of said bores;
(c) a thermocouple element partially received in at least one of said bores of said sleeve member and extending through and beyond said body;
(d) collar means on said thermocouple element;
(e) bias means received at one end in said sleeve member and engaging said collar means to resiliently mount said thermocouple within said body against an end cap secured to a second end of said bores in said body;
(f) a detachable end portion on a portion of said thermocouple element extending beyond said body to facilitate surface layer penetration of the object whose temperature is to be measured; and
(g) means to inhibit rotation of said thermocouple element in said body to facilitate selective removal of said end portion from said thermocouple element.

12. The device of claim 11 wherein each of said detachable end portions on respective thermocouple elements is rotationally detachable.

13. The device of claim 12 wherein each of said detachable end portions is threadably attached to a said respective thermocouple element.

14. The device of claim 13 wherein said thermocouple element is provided with a threaded bore which receives a threaded shank on said end portion.

15. The device of claim 14 wherein said means to inhibit rotation include slots in said housing engaged by means carried by said thermocouple elements.

16. The device of claim 15 wherein pin means carried by said thermocouple elements engage said slots to inhibit rotation of said elements during attachment or detachment of said end portions.

17. The device of claim 16 wherein said slots extend parallel to said bores to permit said elements to slide in said bores while said pin means slide in said slots.

18. The device of claim 17 wherein said pin means comprise threaded members.

19. The device of claim 18 wherein said threaded members are further used to attach leads to said thermocouple elements.

* * * * *